United States Patent [19]

Takahashi

[11] Patent Number: 5,682,166
[45] Date of Patent: Oct. 28, 1997

[54] MULTI-WINDOW APPARATUS WITH AUDIO OUTPUT FUNCTION

[75] Inventor: Satoshi Takahashi, Osaka, Japan

[73] Assignee: Matsushita Electric Industrial Co., Ltd., Osaka, Japan

[21] Appl. No.: 632,738

[22] Filed: Apr. 15, 1996

Related U.S. Application Data

[63] Continuation of Ser. No. 250,598, May 27, 1994, abandoned.

[30] Foreign Application Priority Data

Jun. 1, 1993 [JP] Japan .................................. 5-130218

[51] Int. Cl.$^6$ ........................................... G09G 5/14
[52] U.S. Cl. ................................. 345/119; 340/825.19
[58] Field of Search .............................. 345/119, 120, 345/113, 114; 395/154, 157, 155, 156; 340/825.19; 341/21; 434/112, 116, 117, 114

[56] References Cited

U.S. PATENT DOCUMENTS 5,050,105  9/1991  Peters .
5,075,675 12/1991  Barker et al. ..................... 345/120
5,186,629  2/1993  Rohen .............................. 434/112
5,287,102  2/1994  McKiel, Jr. ..................... 340/825.19

Primary Examiner—Chanh Nguyen
Attorney, Agent, or Firm—McDermott, Will & Emery

[57] ABSTRACT

According to the present invention, there are provided a processor for executing an operating system, a window system, and a filtering program, a display unit for displaying a window generated through the execution of the window system by the processor, and an audio output circuit for accepting an audio signal supplied from the above processor and producing an audio. When a size change or a positional change in relation to another window occurs in the displayed window, the above processor performs a specific filtering process preliminarily related to the above window change. Consequently, in the case where a given window is displayed on the screen of the display unit, while an audio corresponding to the window is being produced, if the window is iconized or hidden by another window, the user can easily recognize the state of the window.

14 Claims, 15 Drawing Sheets

MULTI-WINDOW APPARATUS WITH AUDIO OUTPUT FUNCTION

This is a continuation application of application Ser. No. 08/250,598 filed May 27, 1994, now abandoned.

BACKGROUND OF THE INVENTION

The present invention relates to a multi-window apparatus with audio output function which executes a window system, displays a window on the screen of a display unit, and produces an audio corresponding to the window and, more particularly, to a multi-window apparatus for changing its audio output in response to a change in the window.

With a conventional multi-window apparatus with audio output function in which a window is displayed on the screen of a display unit, an audio corresponding to the displayed window is produced constantly or only if it is required. However, in the case where the displayed window is iconized or when another window is newly displayed in the forefront of the screen through the execution of the latest window system so that the original window is hidden behind or overlapped by the newly displayed window, the audio corresponding to the original window continues to be outputted or the audio output itself is completely halted.

FIG. 22 shows the structure of the conventional multi-window apparatus with audio output function, which comprises a processor 1 for executing an operating system and a window system and producing an audio signal, a display unit 2 for displaying a window which was generated through the execution of the window system by the processor 1, and an audio output circuit 6 for accepting the audio signal 4 generated by the foregoing processor 1 and producing an audio 7.

As shown in the upper part of FIG. 23, the above conventional multi-window apparatus with audio output function of FIG. 22 displays a plurality of windows A, B, and C on the screen of the display unit 2, which were generated through the execution of the window system by the processor 1. In response to any of the windows (the forefront window A in the drawing), the audio output circuit 6 produces an audio corresponding to the supplied audio signal. If the window B is newly displayed in the forefront and the window A is hidden behind it, as shown in the lower part of FIG. 23, the processor 1 does not supply the audio signal 4 any more and the audio output circuit 6 halts the production of the audio 7.

However, the above conventional multi-window apparatus with audio output function has the following drawbacks: that is, with a plurality of windows being displayed on the screen of the display unit while producing an audio corresponding to the forefront one, if a forefront window is hidden by another window and if the audio continues to be produced, it is difficult to judge whether the audio being produced corresponds to the window newly displayed in the forefront or to the window hidden behind it. If the audio being produced is halted in the same situation as described above, on the other hand, it is difficult to judge whether or not the posterior window normally operates and whether or not the audio signal is supplied. The above drawbacks are produced not only in the case where another window takes place In the forefront of the screen, as described above, but also in cases where a change occurs in the window being displayed on the screen of the display unit, such as the case where the window is iconized.

SUMMARY OF THE INVENTION

It is therefore an object of the present invention to provide a multi-window apparatus with audio output function which enables the user, if a change occurs in the window displayed on the screen of the display unit, to easily recognize the normal operation of the hidden or iconized window through a filtering process which is performed with respect to an audio signal in response to the change in the window being displayed and to easily recognize, of a plurality of windows displayed on the screen of the display unit, which one corresponds to the audio being produced.

To attain the above object, the multi-window apparatus with audio output function of the present invention comprises: an audio signal generating means for generating an audio signal; a control means for executing an operating system, a window system, and a filtering program and accepting the audio signal outputted from the above audio signal generating means; a display unit for displaying a window which was generated through the execution of the window system by the above control means; and an audio output circuit for accepting the audio signal supplied from the above control means and producing an audio. The above multi-window apparatus with audio output function displays the window on the screen of the above display unit, while enabling the above audio output circuit to produce the audio corresponding to the above window constantly or if required. The above control means has a window change detecting means for detecting a window change which is a size change or a positional change in relation to another window, which occurs in the window displayed on the screen of the above display unit, while the audio corresponding to the displayed window is being produced from the above audio output circuit, so as to perform, when the above window change detecting means detects the above window change, a specific filtering process corresponding to the window change with respect to the audio signal to be supplied to the above audio output circuit.

In the above multi-window apparatus with audio output function according to the present invention, the filtering process performed by the control means is specified. If the window is hidden behind another window, the control means performs a band-pass filtering process with respect to the audio signal corresponding to the hidden window.

According to the present invention, the filtering process performed by the above control means is further specified. If the window is reduced in area, the control means performs a low-pass filtering process with respect to the audio signal corresponding to the reduced window.

According to the present invention, the filtering process performed by the above control means is still further specified.

If the window is iconized, the control means performs a high-pass filtering process with respect to the audio signal corresponding to the iconized window.

With the above structure, since the control means executes the operating system and window system according to the present invention, the window is displayed on the screen of the display unit and the above control means supplies, to the audio output circuit, an audio signal corresponding to the window being displayed. Consequently, an audio corresponding to the window being displayed is produced from the audio output circuit.

From the foregoing state, if a size change or a positional change in relation to another window occurs in the window being displayed, the control means performs a specific filtering process corresponding to the window change with respect to the audio signal to be supplied to the audio output circuit. For example, if the window is hidden behind another window, a band-pass filtering process is performed. If the window is reduced in area, a low-pass filtering process is performed. If the window is iconized, a high-pass filtering process is performed. As a result, an audio corresponding to a change in the window being displayed is produced from the audio output circuit.

The above object and novel features of the present invention will more fully appear from the following detailed description when the same is read in connection with the accompanying drawings.

BRIEF DESCRIPTION OF THE DRAWINGS

The accompanying drawings show preferred embodiments of the present invention, wherein.

DETAILED DESCRIPTION OF THE PREFERRED EMBODIMENTS

Below, preferred embodiments of a multi-window apparatus with audio output function according to the present invention will be described with reference to the accompanying drawings.

FIRST EMBODIMENT

Figure 1:
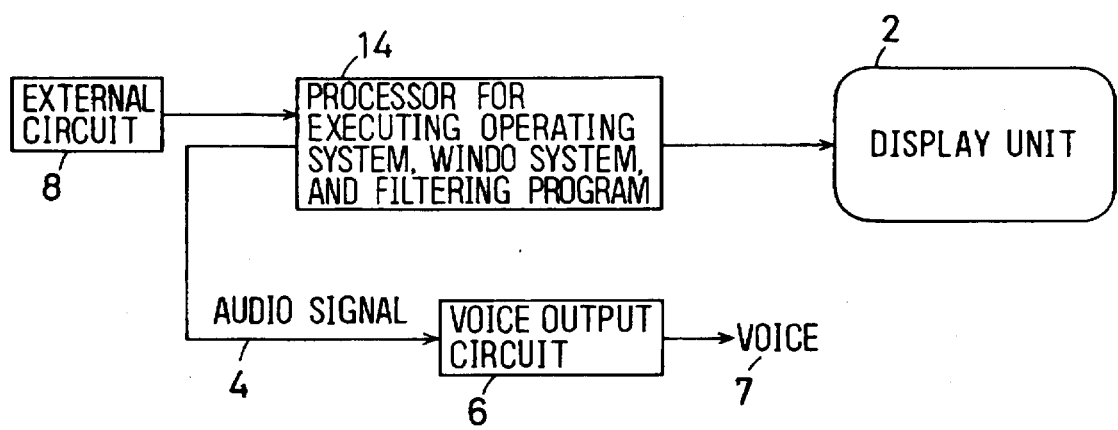
FIG. 1 is a view showing the structure of a first embodiment.

FIG. 1 shows the structure of a multi-window apparatus with audio output function. In the drawing, a reference numeral 14 designates a processor for executing an operating system, a window system, and a filtering program while generating an audio signal 4, 2 designates a display unit for displaying a window which was generated through the execution of the window system by the above processor 14, 6 designates an audio output circuit for accepting the audio signal 4 supplied from the above processor 14 and producing an audio 7, and 8 designates an external circuit for generating an audio signal. Specifically, the external circuit 8 accepts an analog signal outputted from, e.g., a microphone or an amplifier, performs analog to digital conversion with respect to the analog signal using a sampling frequency of about 40 kHz, and supplies the resulting signal in the digital audio waveform to the processor 14.

Figure 2:
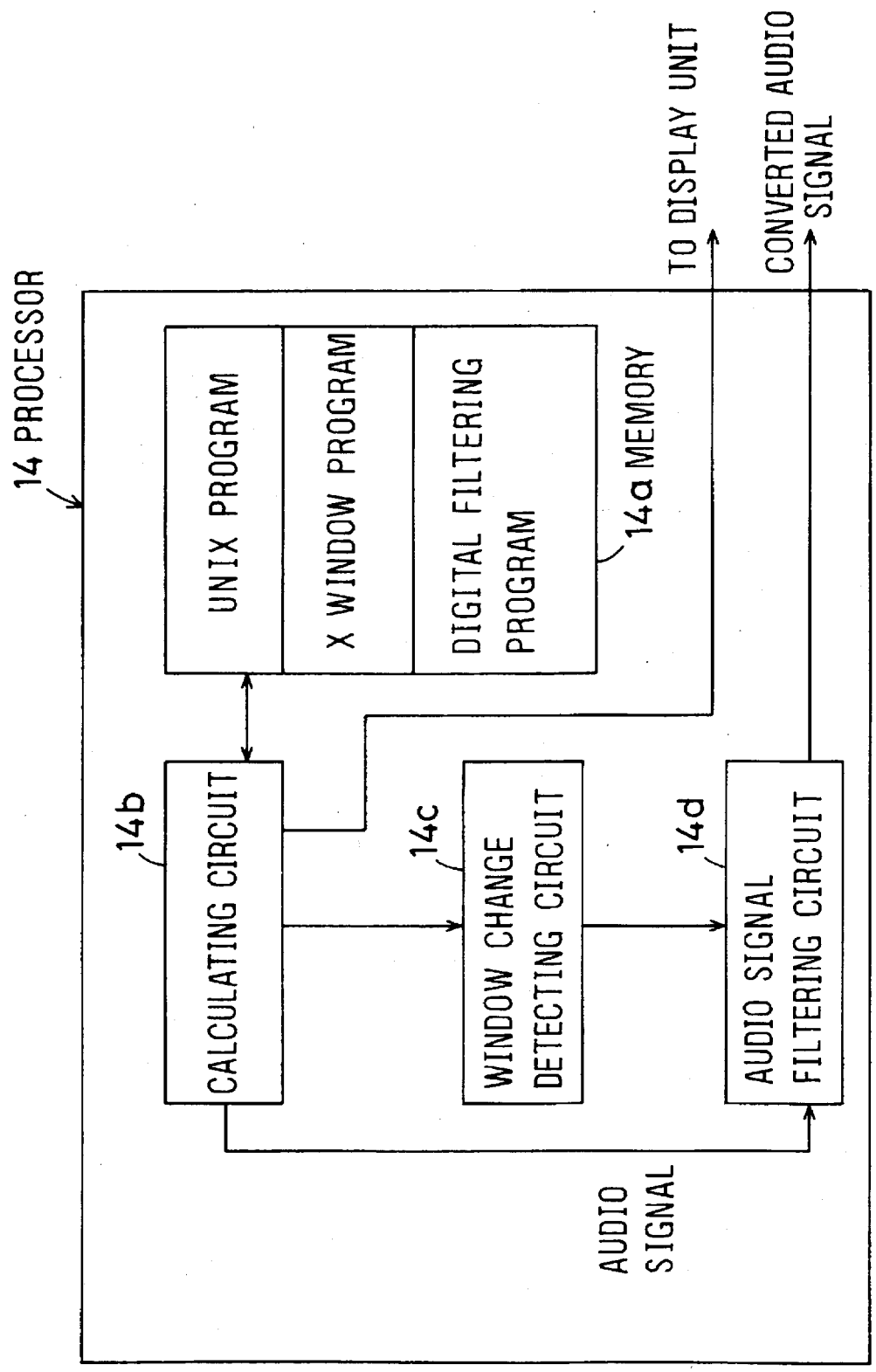
FIG. 2 is a block diagram showing the internal structure of the processor of FIG. 1.

FIG. 2 shows the internal structure of the above processor 14. In the drawing, a reference numeral 14a designates a memory in which a program of the operating system, a program of the window system, and a program for subjecting an audio signal to a digital filtering process are preliminarily stored. As a specific example of the program of the operating system mentioned above, there can be listed the program of UNIX, which is a multi-tasking operating system. With the adoption of the program, a plurality of programs can be operated simultaneously. As a specific example of the program of the window system, there can be listed the program of X MULTI-WINDOW SYSTEM, which is a multi-window system. With the adoption of the program, a plurality of windows can be operated simultaneously.

In the above internal structure of the processor 14 of FIG. 2, a reference numeral 14b designates a calculating circuit, which reads a required program from the above memory 14a at an appropriate time and executes it, while producing the digital audio waveform through calculations and generating the audio signal 4, or reads the digital audio waveform from the above external circuit 8 and generates the audio signal 4. A reference numeral 14c designates a window change detecting circuit (window change detecting means) and 14d designates an audio signal filtering circuit.

Figure 3:
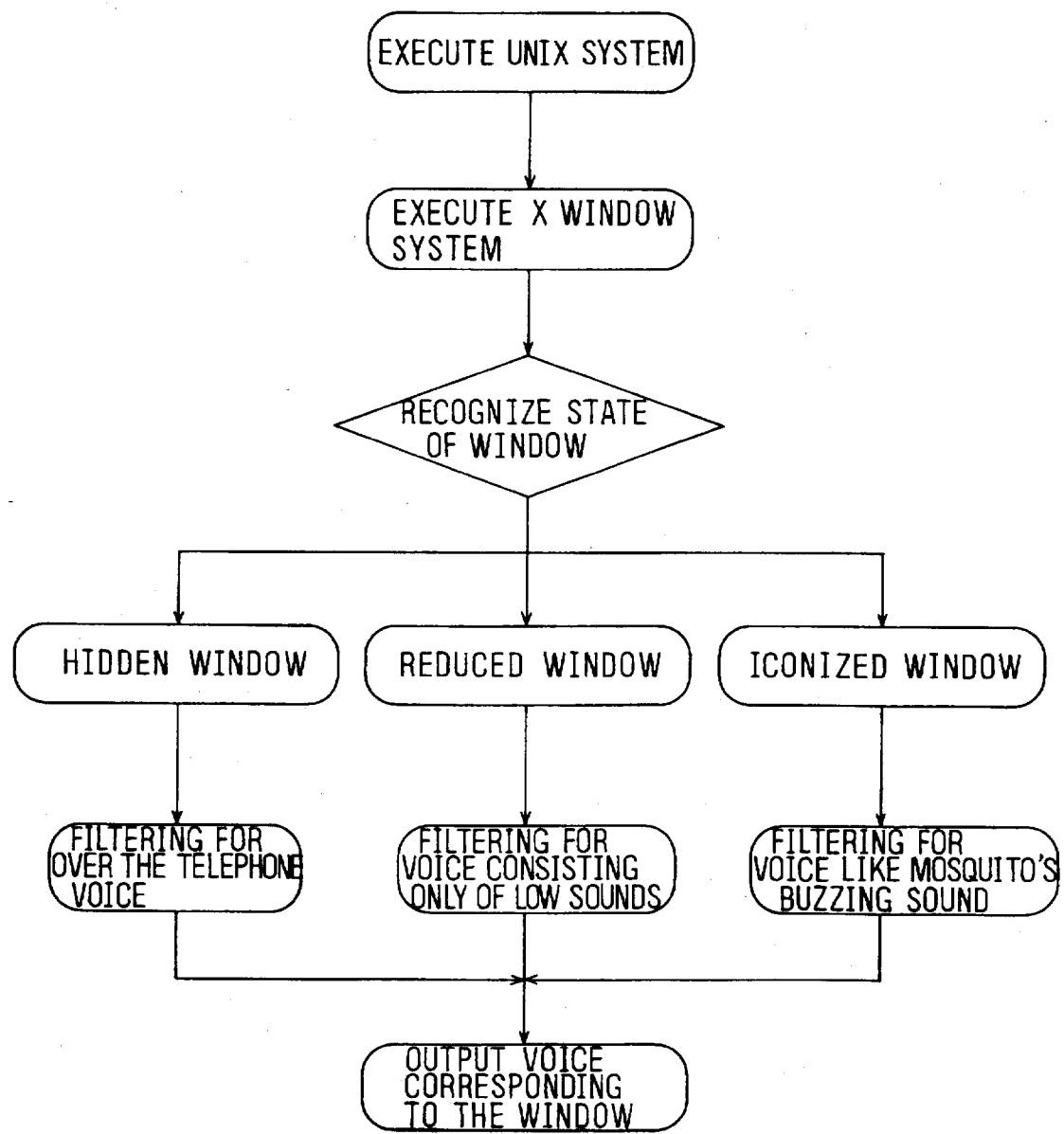
FIG. 3 is a flow chart illustrating the function of the window change detecting circuit of FIG. 1.

As shown in FIG. 3, the above window change detecting means 14c performs a function of detecting, when the above calculating circuit 14b executes the operating system (UNIX system) and then X MULTI-WINDOW SYSTEM, a change in the positional relationship between a plurality of windows displayed on the screen of the above display unit 2 and a size change of any of the windows through the execution of the multi-window system. The window change detecting means 14c also performs the following functions, depending on circumstances. If it judges that one window is hidden behind another window, the window change detecting means 14c commands the above audio signal filtering circuit 14d to perform a band-pass filtering process at 600 to 700 Hz with respect to the audio signal which corresponds to the hidden window, so that an audio as if through a telephone line is produced. If it judges that one window is reduced in size, the window change detecting means 14c commands the above audio signal filtering circuit 14d to perform, with respect to the audio signal, a low-pass filtering process which permits the passing of a signal equal to or lower than 1 kHz, so that the produced audio contains only low sounds. If it judges that one window is iconized, the window change detecting means 14c commands the above audio signal filtering circuit 14d to perform, with respect to the audio signal, a high-pass filtering process which permits the passing of a signal equal to or higher than 1 kHz, so that an audio similar to the buzzing sound of a mosquito is produced.

The above audio signal filtering circuit 14d is composed of a digital filtering circuit which receives an audio signal from the above calculating circuit 14b and stores a program for performing sampling with respect to the audio signal and performing a specified filtering process such as the high-pass filtering process, band-pass filtering process, or low-pass filtering process with respect to the sampled data based on the results of calculations and outputs the digital audio waveform obtained through the filtering process. Therefore, if a change occurs in the positional relationship between the plurality of windows or in the size of any window, the audio signal filtering circuit 14d can perform a filtering process in response to the change with respect to an audio signal corresponding to the window in which the change occurred.

The above audio output circuit 6 is for performing digital to analog conversion with respect to a converted audio signal, which is the digital audio waveform obtained through the filtering process by the above processor 14 and producing the analog audio 7.

Figure 21:
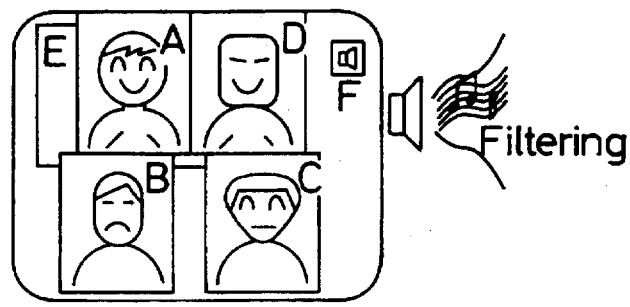
FIG. 21(a) is a view illustrating the initial state of the first embodiment in the case where it is used at a TV conference.
FIG. 21(b) is a view illustrating the case where one window is reduced in size at the TV conference.
FIG. 21(c) is a view illustrating the case where a window for a word processor is positioned in the forefront of the screen at the TV conference.
FIG. 21(d) is a view illustrating the case where a window which has been iconized is restored to the original window.
Figure 21:
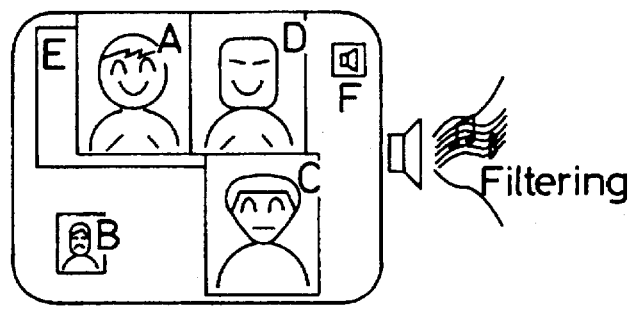
Figure 21:
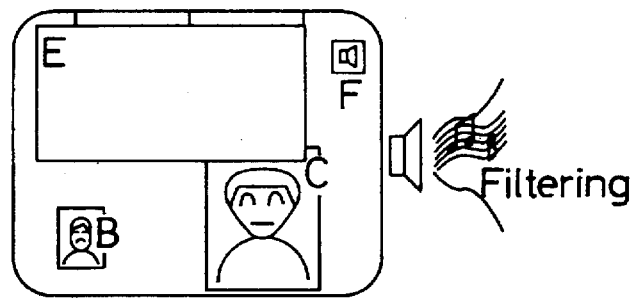
Figure 21:
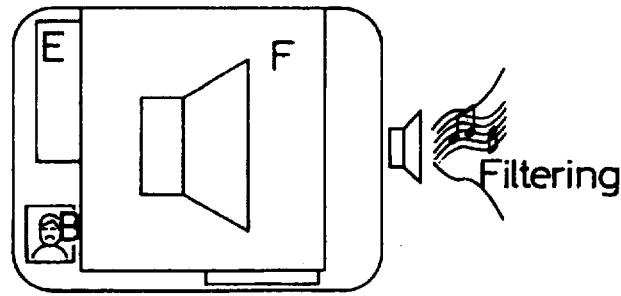
Figure 22:
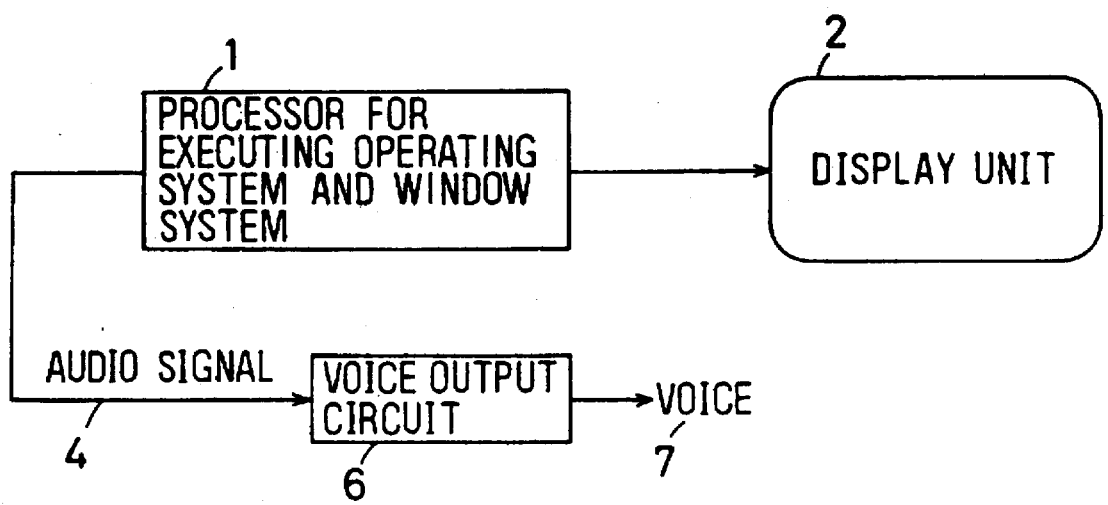
FIG. 22 is a block diagram showing the structure of a conventional embodiment.
Figure 23:
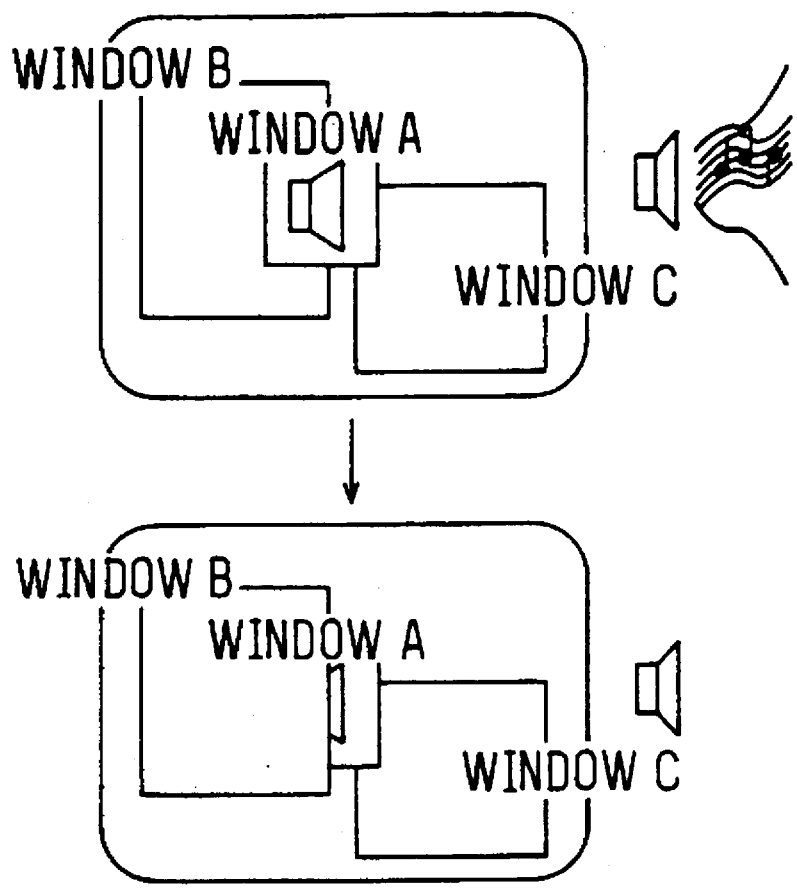
FIG. 23 is a view illustrating the operation of the conventional embodiment.

Next, the operation of the present embodiment will be described with reference to FIGS. 21 using, as an example, the case where a TV conference is held by a plurality of conferees in different places.

In the initial state, as shown in FIG. 21(a), the animations of the plurality of conferees (four conferees designated by the symbols A to D in the drawing) at the TV conference are displayed in the four forefront windows on the screen of the display unit 2. Corresponding to the individual windows, the audios of the above conferees are outputted from the audio output circuit 6. In addition to the above four forefront windows, there are also displayed on the screen of the display unit 2: a window E for a word processor which is used by the conferees at the TV conference to take minutes of the proceedings; and a window F for showing a TV, which is iconized.

From the initial state, if the window of a passive conferee (e.g., the conferee B) is reduced in size as shown in FIG. 21(b), the window change detecting circuit 14c detects the size reduction of the window. If the passive conferee B makes a remark afterward and the calculating circuit 14a outputs the audio signal 4 correspondingly, the audio signal filtering circuit 14d performs, according to a digital filtering program, a low-pass filtering process at a frequency equal to or lower than 1 kHz with respect to the audio signal 4, so that the audio corresponding to the reduced window contains no more high sound that is the component of a frequency over 1 kHz, resulting in the muffled audio 7 consisting only of low sounds. As a result, on hearing the muffled audio 7, the user can easily recognize the passive conferee B appearing in the reduced window on the screen as well as the normal operation of the window.

Next, if the processor 14 accepts a command that the conferee A take minutes of the proceedings, the window system in the processor 14 is executed so that the window E for a word processor is positioned in the forefront of the screen. In this case, as shown in FIG. 21(c), the window showing the animation of the conferee A and the window showing the animation of the conferee B are hidden behind the above window E for a word processor. Then, the window change detecting circuit 14c detects the retreat of the windows showing the animations of the conferees A and B and performs, according to the digital filtering program, a band-pass filtering process at 600 to 700 Hz with respect to the audio signals 4 for the conferees A and B. Consequently, the audios produced from the audio output circuit 6 corresponding to the two hidden windows become the over-the-telephone audio 7. As a result, even though it is difficult to specify, from the over-the-telephone audio 7, the conferees A and B who made remarks on the screen, the user can recognize that the windows showing the animations of the conferees A and B who made remarks are hidden behind the window E for a word processor and that the hidden windows are normally operating.

Moreover, since the above window F is iconized by the processor 14, the audio signal filtering circuit 14d of the processor 14 performs, according to the filtering program, a high-pass filtering process at 1 kHz or higher which corresponds to the iconization of the window F with respect to the digital audio waveform. As a result, the audio outputted from the audio output circuit 6 contains no more low sound lower than 1 kHz, resulting in the audio 7 similar to the buzzing sound of a mosquito consisting only of high sounds over 1 kHz. Consequently, the user can easily recognize that the window F corresponding to the audio 7 being outputted is iconized and that the window F is normally operating. In this case, if the iconized window F is restored to the original window displaying a TV screen as shown in FIG. 21(d), the filtering operation by the above audio signal filtering circuit 14d is ceased, so that the user can listen to regular TV audios.

As described above, even when a plurality of windows are displayed on the screen of the display unit 2 and audios are outputted corresponding to two or more of the windows, the user can easily recognize which audio corresponds to which window.

As illustrated above, when one window is hidden behind another window positioned in the forefront, the band-pass filtering process at 600 Hz to 2 kHz is performed. In the case of iconization, the high-pass filtering process is performed. In the case of size reduction, the low-pass filtering process is performed. It is also possible to perform the low-pass filtering process at a frequency which is sufficiently low to minimize the size of the window. In the case of deforming the window, the band-pass filtering process in another frequency range may be performed. During the period during which the window is being moved to another position, a filtering process whereby a cutoff frequency dynamically changes with respect to a time axis may be performed. Once the manner of performing digital filtering processes which correspond to the individual cases of window changes is preliminarily determined, the user can easily recognize, on hearing the audio 7 outputted from the audio output circuit 6, the state of the corresponding window without looking at the window as well as the normal output operation of the audio. Furthermore, in the case where a plurality of audios corresponding to the plurality of windows are simultaneously outputted from the audio output circuit 6, if filtering processes corresponding to the individual audios are performed, the user can recognize the states of the windows corresponding to the individual audios.

In the present embodiment, an analog signal from, e.g., an external microphone or amplifier is converted to the digital audio signal by the external circuit 8, inputted to the processor 14, subjected to a filtering process corresponding to a window change in the processor 14, and then supplied to the audio output circuit 6 so as to produce an audio therefrom. In this case, the processor 14 does not produce the audio signal. Consequently, upon hearing the audio 7 outputted from the audio output circuit 6, the user can recognize the state of the window corresponding to the audio as well as the normal operation of the audio, while an analog signal from a microphone or the like can be used together with the window.

SECOND EMBODIMENT

Figure 4:
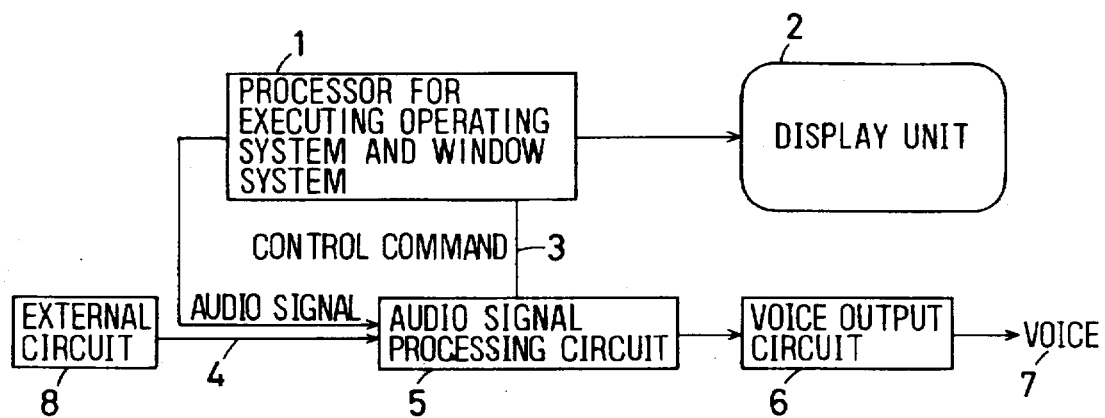
FIG. 4 is a block diagram showing the structure of a second embodiment.

FIG. 4 shows a second embodiment, which is different from the first embodiment of FIG. 1 in that a processor 1 of FIG. 4 executes only the operating system and window system and an audio signal processing circuit 5 for performing a digital filtering process with respect to the audio signal is separately provided, while the processor 14 of FIG. 1 executes the operating system, window system, and filtering program.

In cases where a window in the forefront of the screen is hidden by another window, the above processor 1 sets a control command 3 which corresponds to the current state of the formerly forefront window being hidden. The above audio signal processing circuit 5 is supplied with the audio signal 4 from the processor 1 and in turn supplies the audio signal as it is to the audio output circuit 6, while performing a digital filtering process with respect to the audio signal 4 supplied from the foregoing processor 1 in accordance with the control command 3 set by the foregoing processor 1 and outputting the filtered audio signal to the audio output circuit 6.

In the drawing, the reference numeral 8 designates an external circuit similar to the foregoing external circuit 8 of FIG. 1. The external circuit 8 of the present embodiment accepts an analog signal outputted from, e.g., a microphone or an amplifier, subjects the accepted analog signal to A/D conversion using a sampling frequency of about 40 kHz, and then supplies the resulting signal in the digital audio waveform to the audio signal processing circuit 5 or supplies the accepted analog signal in the analog audio waveform as it is to the audio signal processing circuit 5. The audio signal processing circuit 5 performs the following functions, depending on circumstances. If a signal from the external circuit 8 is in the digital audio waveform, the audio signal processing circuit 5 performs a digital filtering process with respect to the signal. Conversely, if a signal from the external circuit 8 is in the analog audio waveform, the audio signal processing circuit 5 performs an analog filtering process with respect to the signal or subjects the inputted analog audio waveform to A/D conversion using a sampling frequency of about 40 kHz and then performs a digital filtering process with respect to the resulting digital audio waveform.

Thus, according to the present second embodiment, in cases where a forefront window is hidden behind another window, the audio signal processing circuit 5 performs a digital filtering process, e.g., the band-pass filtering process at a frequency of 600 Hz to 2 kHz with respect to the audio signal supplied from the processor 1 in accordance with the control command 3 set by the processor 1, so that the user can recognize, on hearing the audio 7 outputted from the audio output circuit 6, the state of the window corresponding to the audio.

Moreover, since the audio signal processing circuit 5 for performing a digital filtering process is provided separately from the processor 1, the present second embodiment has the effect of reducing, by executing the filtering program, the load on the processor 1, in addition to the same effect as obtained in the above first embodiment.

Furthermore, the present second embodiment has the effects that an analog signal from a microphone or the like can be used together with the window in the presence of the external circuit 8 and that the user can recognize, on hearing the audio 7 outputted from the audio output circuit 6, the state of the window corresponding to the audio. If the audio signal processing circuit 5 is composed of an analog filter, the present embodiment further exerts the effect of directly processing the analog signal from the external circuit 8 without subjecting it to A/D conversion.

THIRD EMBODIMENT

Figure 5:
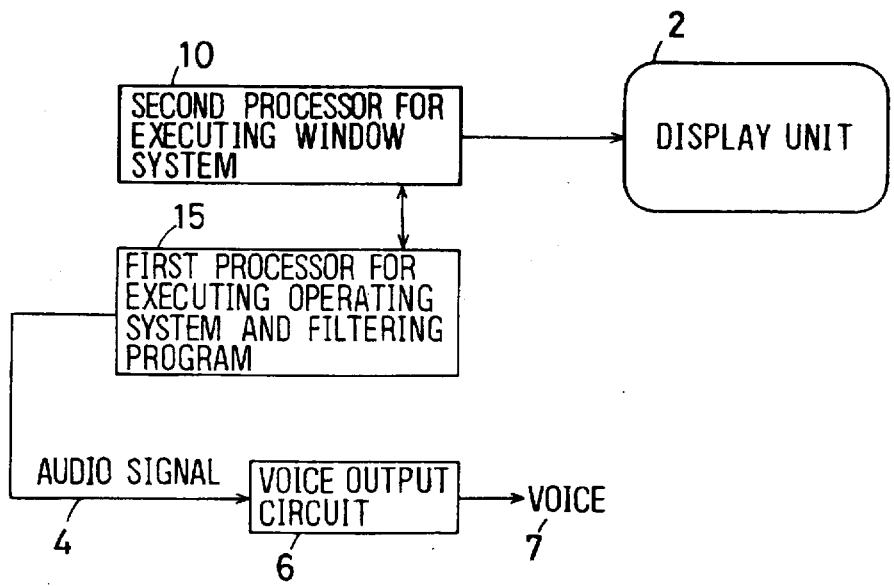
FIG. 5 is a block diagram showing the structure of a third embodiment.

FIG. 5 shows a third embodiment, which is different from the first embodiment of FIG. 1 in that the functions of the processor 1 are shared by two processors 15 and 10. The first processor 15 executes the operating system and filtering program, while the second processor 10 generates the audio signal 4, executes the window system, and displays, on the display unit 2, the window generated through the execution of the window system.

Thus, since the second processor 10 for executing the window system is separately provided, the present embodiment has the effect of reducing, by executing the window system, the load on the first processor 15 for executing the operating system, in addition to the same effect as obtained in the above first embodiment.

FOURTH EMBODIMENT

Figure 6:
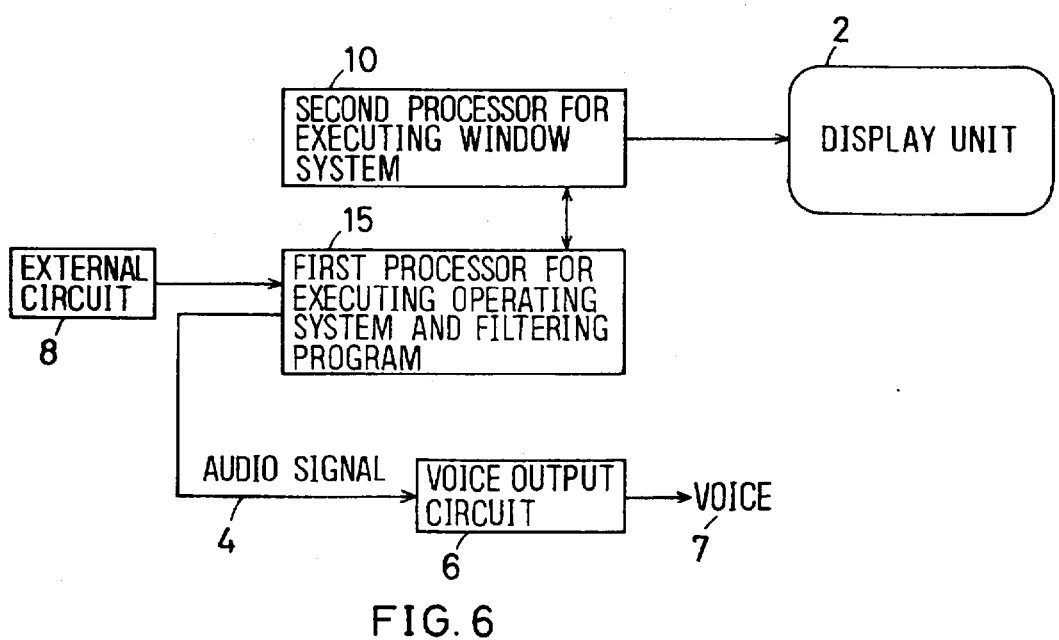
FIG. 6 is a block diagram showing the structure of a fourth embodiment.

FIG. 6 shows a fourth embodiment, which was obtained by partly changing the structure of the first processor 15 of the third embodiment shown in FIG. 5. That is, though the first processor 15 of FIG. 5 produces an audio signal, the first processor 15 of FIG. 6 does not produce an audio signal. Instead, the external circuit 8 for supplying a digital audio waveform is provided, similarly to the first embodiment, so as to accept an analog signal outputted from, e.g., a microphone or an amplifier, perform A/D conversion with respect to the accepted analog signal, and supplies the resulting signal in the digital audio waveform to the processor 15.

Thus, in the present embodiment also, an analog signal from, e.g., an external microphone or an amplifier can be converted to the digital audio signal via the external circuit 8 so that an audio can be produced from the audio output circuit 6, similarly to the above first embodiment. Consequently, an analog signal from a microphone or the like can be used together with the window.

FIFTH EMBODIMENT

Figure 7:
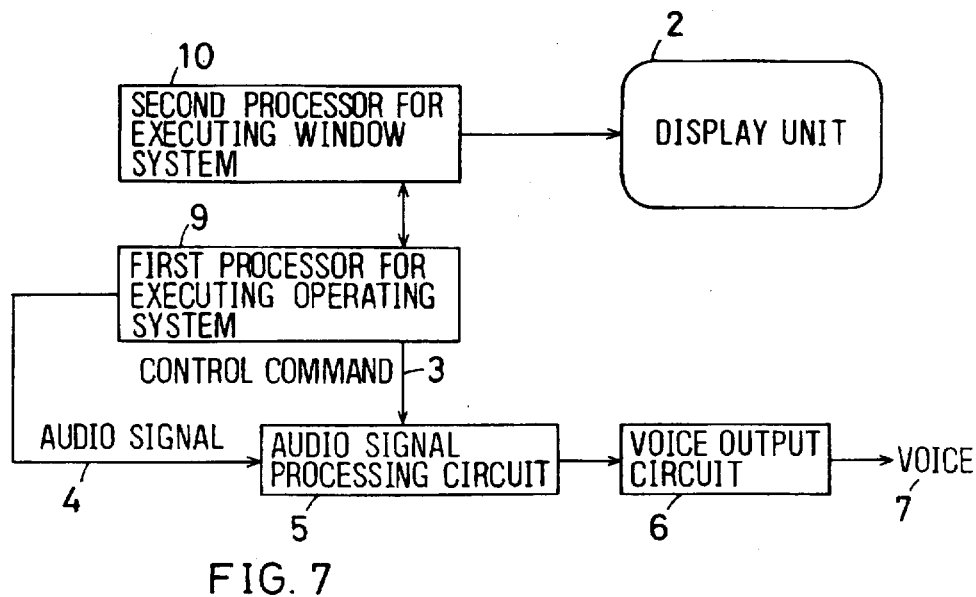
FIG. 7 is a block diagram showing the structure of a fifth embodiment.
Figure 15:
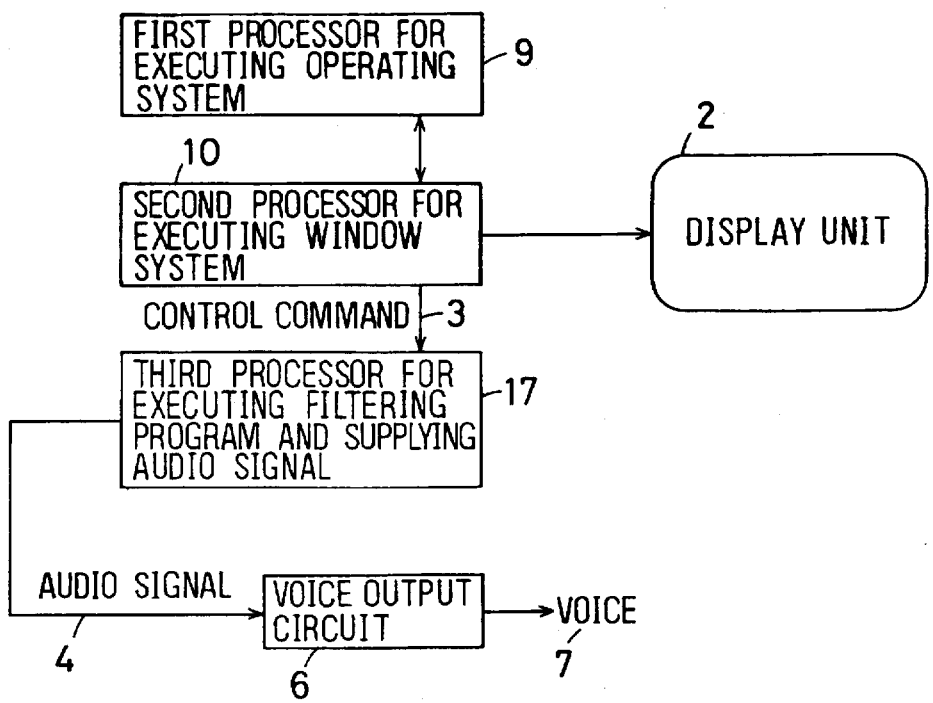
FIG. 15 is a block diagram showing the structure of a thirteenth embodiment.

FIG. 7 shows a fifth embodiment, which was obtained by assigning the functions of the first processor 15 of the above third embodiment shown in FIG. 15 to two components: a first processor 9 generates an audio signal and executes only the operating system, while the audio signal processing circuit 5, which is separately provided, performs a filtering process with respect to the audio signal, similarly to the above second embodiment shown in FIG. 3.

The above first processor 9 sets, in cases where the window is hidden by another window, the control command 3 corresponding to the change in the window. The audio signal processing circuit 5 is supplied with the audio signal 4 from the first processor 9, and normally supplies the audio signal 4 as it is to the audio output circuit 6. In the case where the control command 3 is set by the first processor 9, the audio signal processing circuit 5 performs a filtering process, in accordance with the control command 3, with respect to the audio signal 4 supplied from the first processor 9.

Thus, in addition to the same effect as obtained in the third embodiment, the present embodiment also has the effect of reducing the load on the first processor 9, since the audio signal processing circuit 5 performs a digital filtering process.

SIXTH EMBODIMENT

Figure 8:
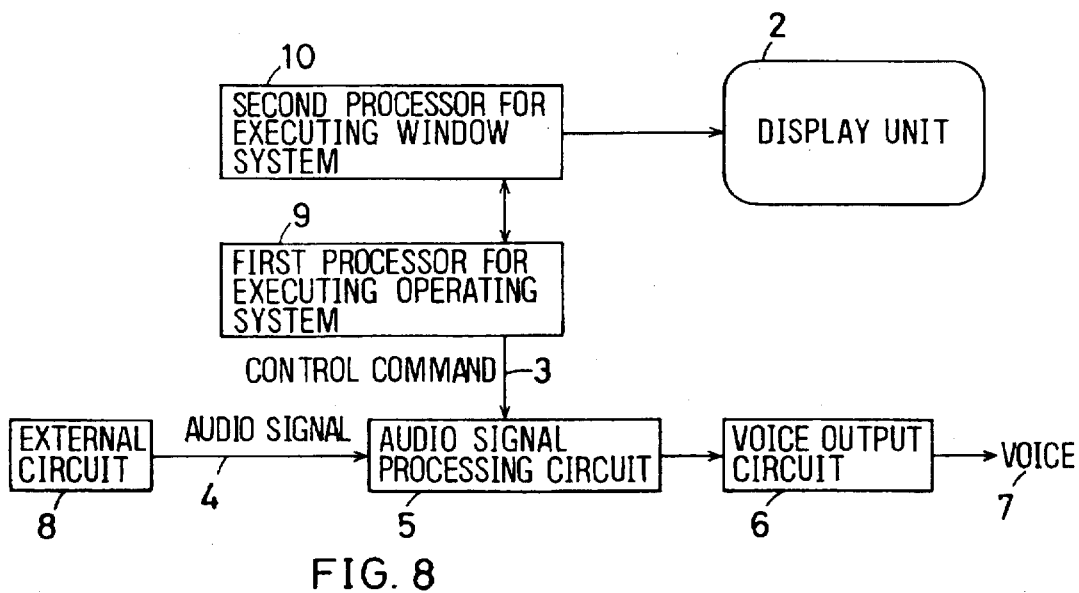
FIG. 8 is a block diagram showing the structure of a sixth embodiment.

FIG. 8 shows a sixth embodiment, which was obtained by partly changing the fifth embodiment of FIG. 7. That is, according to the present embodiment, the first processor 9 does not generate an audio signal. Instead, there is provided an external circuit 8, which is identical with the external circuit 8 of the above second embodiment shown in FIG. 4. A digital audio waveform or an analog audio waveform from the external circuit 8 is supplied as the audio signal 4 to the audio signal processing circuit 5. If the audio signal 4 from the external circuit 8 is in the digital audio waveform, the audio signal processing circuit 5 performs a digital filtering process. Conversely, if the audio signal 4 from the external circuit 8 is in the analog audio waveform, the audio signal processing circuit 5 performs an analog filtering process with respect to the audio signal 4 or performs A/D conversion with respect to the analog audio waveform using a sampling frequency of about 40 kHz and then performs a digital filtering process with respect to the resulting digital audio waveform.

Thus, in addition to the effect of the fifth embodiment, the present embodiment has the effect of converting an analog signal from, e.g., an external microphone or amplifier to the digital audio waveform via the external circuit 8, similarly to the second embodiment of FIG. 4. Consequently, an analog signal from a microphone or the like can be used together with the window. If the audio signal processing circuit 5 is composed of an analog filter, the present embodiment further exerts the effect of directly processing the analog signal from the external circuit 8 without subjecting it to A/D conversion.

SEVENTH EMBODIMENT

Figure 9:
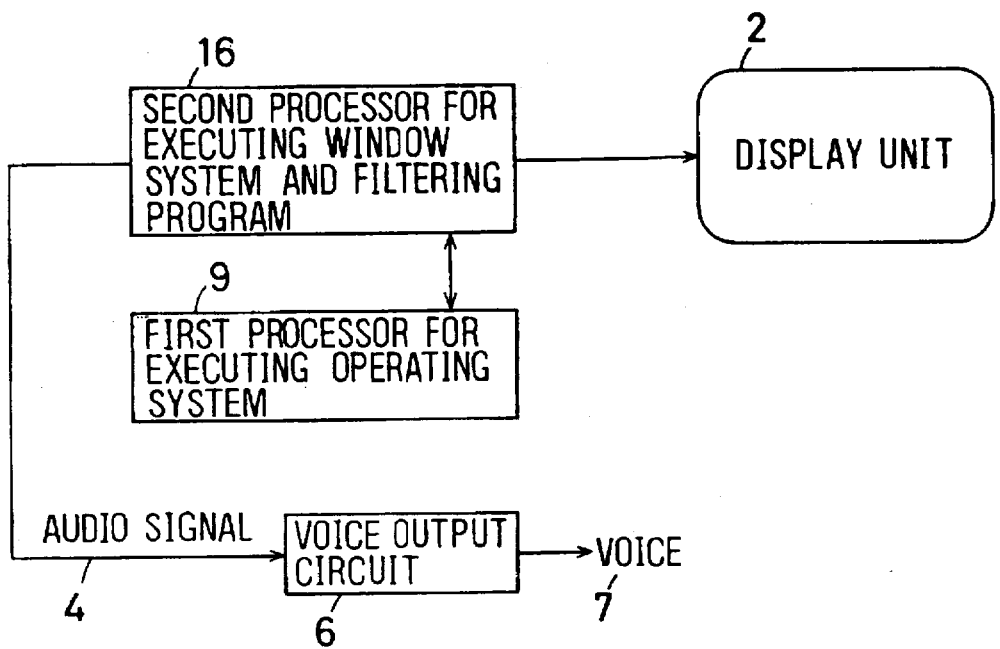
FIG. 9 is a block diagram showing the structure of a seventh embodiment.

FIG. 9 shows a seventh embodiment, which was obtained by partly modifying the fifth embodiment shown in FIG. 7. That is, the present embodiment is constituted so that a second processor 16 executes the filtering program in the absence of the audio signal processing circuit 5 for performing a filtering operation. In place of the first processor 9, the second processor 16 is used to generate an audio signal.

Thus, the present embodiment has the effect of reducing the load on the first processor 9 by the load on the second processor 16 for executing the window system and supplying the audio signal, since the first processor 9 executes only the operating system.

EIGHTH EMBODIMENT

Figure 10:
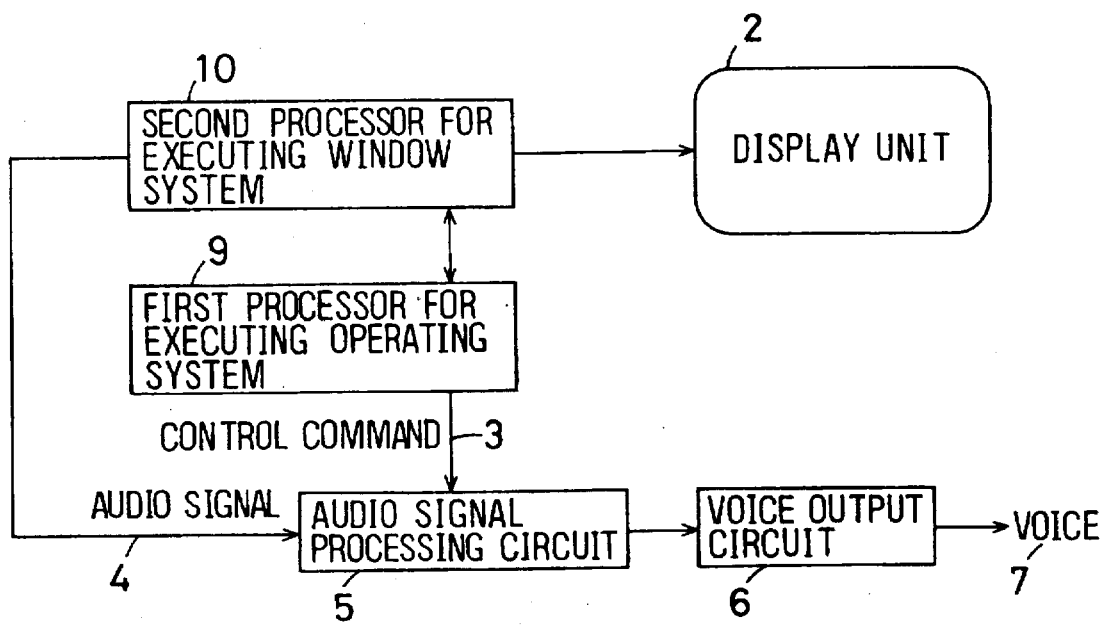
FIG. 10 is a block diagram showing the structure of an eighth embodiment.

FIG. 10 shows an eighth embodiment, which was obtained by partly modifying the fifth embodiment shown in FIG. 7. That is, the present embodiment is constituted so that, in place of the first processor 9, the second processor 10 is used to generate an audio signal.

Thus, compared with the seventh embodiment of FIG. 9 in which the second processor 10 executes the filtering program, the present embodiment has the effect of reducing the load on the second processor 10, since the audio signal processing circuit 5 performs a digital filtering process instead.

NINTH EMBODIMENT

Figure 11:
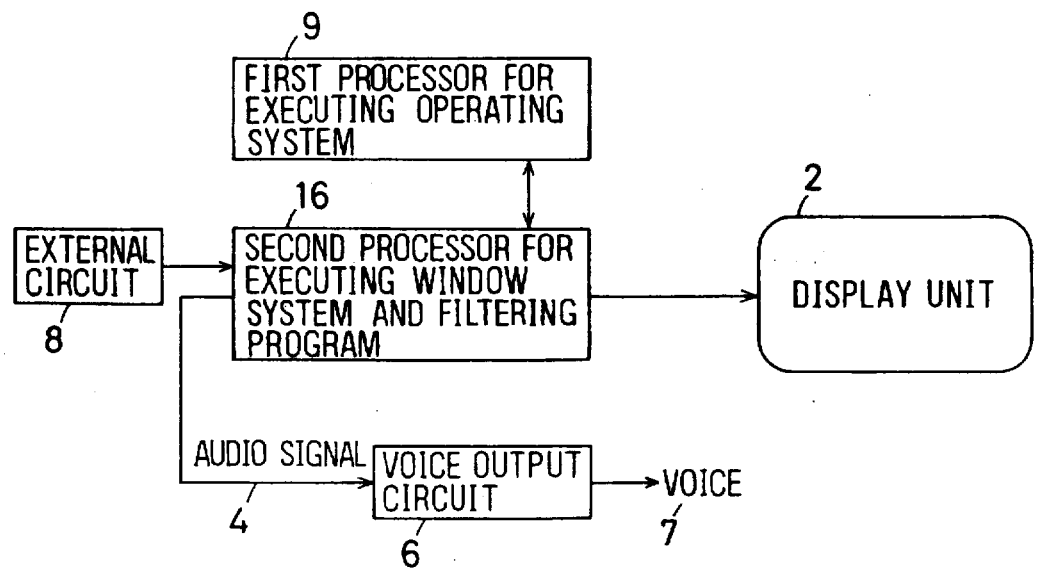
FIG. 11 is a block diagram showing the structure of a ninth embodiment.

FIG. 11 shows a ninth embodiment, which was obtained by partly modifying the above structure shown in FIG. 9. That is, according to the present embodiment, the second processor 16 does not generate an audio signal and an external circuit 8 having the same structure as that of the foregoing external circuit 8 shown in FIG. 2 is added, so that the digital audio waveform generated by the external circuit 8 is supplied to the second processor 16.

Thus, in addition to the same effect as obtained in the above seventh embodiment, the present invention has the effect that an analog signal from a microphone or the like can be used together with the window, since an audio can be produced from the audio output circuit 6 by converting an analog signal from, e.g., an external microphone or amplifier to the digital signal, similarly to the above first embodiment of FIG. 1. Consequently, an analog signal from a microphone or the like can be used together with the window.

TENTH EMBODIMENT

Figure 12:
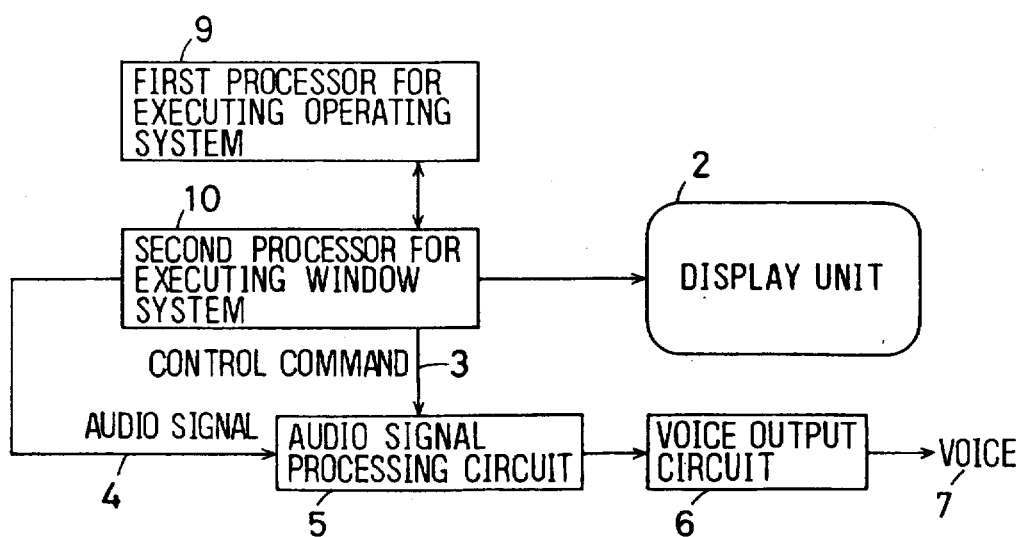
FIG. 12 is a block diagram showing the structure of a tenth embodiment.

FIG. 12 shows a tenth embodiment, which was obtained by partly modifying the structure of FIG. 10. That is, though the control command is set by the first processor 9 for executing the operating system in the above structure of FIG. 10, the control command is set by the second processor 10 for executing the window system in the present embodiment.

Thus, in the present embodiment, the second processor 10 controls the display unit 2 and audio signal processing circuit 5, so that an audio produced from the audio output circuit 6 can be changed in synchronization with a change in the window displayed on the screen of the display unit 2.

ELEVENTH EMBODIMENT

Figure 13:
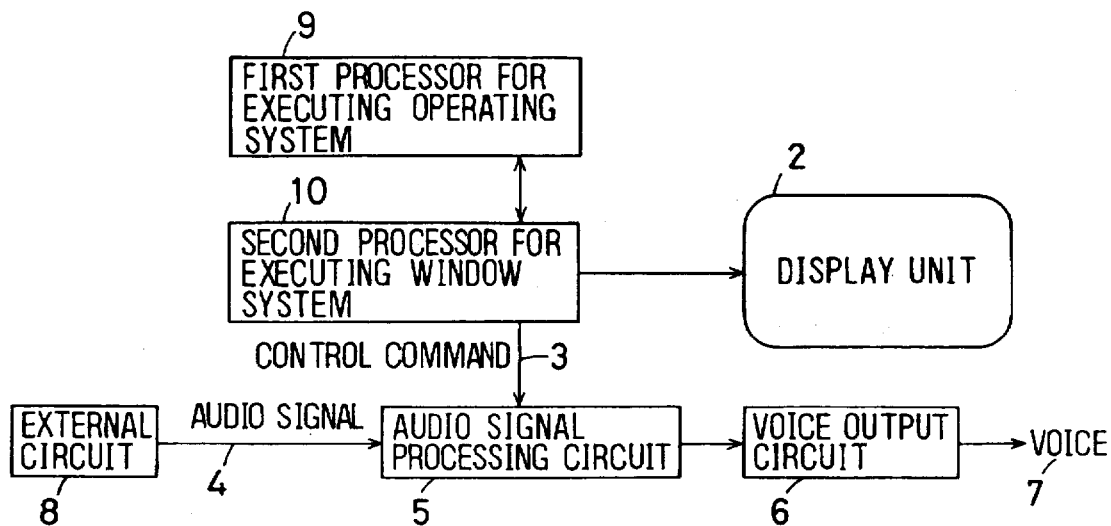
FIG. 13 is a block diagram showing the structure of an eleventh embodiment.

FIG. 13 shows an eleventh embodiment, which was obtained by partly modifying the tenth embodiment shown in FIG. 12. According to the present embodiment, the second processor 10 does not generate an audio signal. Instead, an external circuit 8 having the same structure as that of the foregoing external circuit 8 shown in FIG. 4, which is separately provided, is used to generate the audio signal.

Thus, in addition to the effect of the embodiment shown in FIG. 12, the present embodiment has the effect that an analog signal from a microphone or the like can be used together with the window, since an audio can be produced from the audio output circuit 6 by converting an analog signal from, e.g., an external microphone or amplifier to the digital audio waveform via the external circuit 8, similarly to the sixth embodiment of FIG. 8. If the audio signal processing circuit 5 is composed of an analog filter, the present embodiment exerts the effect of directly processing the analog signal from the external circuit 8 without subjecting it to A/D conversion.

TWELFTH EMBODIMENT

Figure 14:
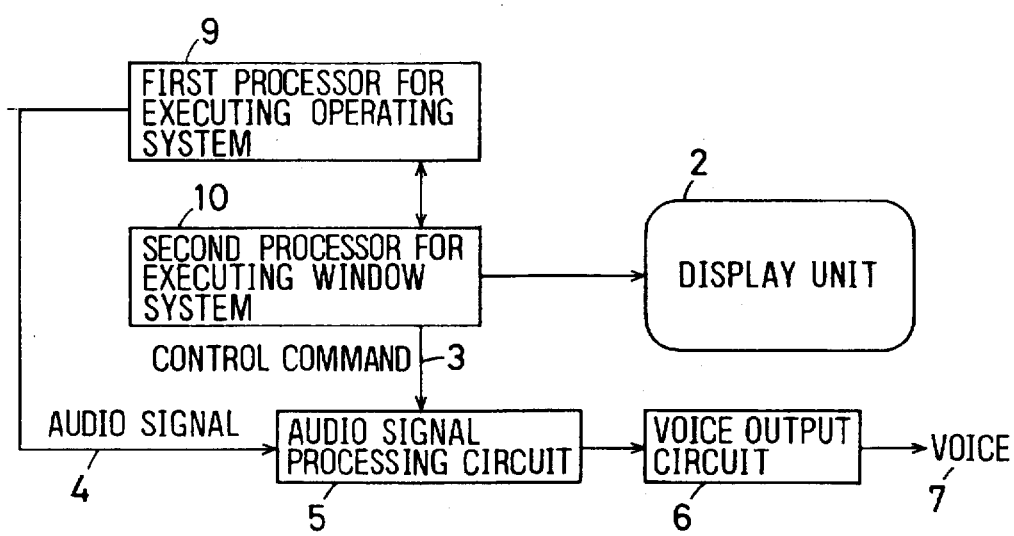
FIG. 14 is a block diagram showing the structure of a twelfth embodiment.

FIG. 14 shows a twelfth embodiment, which was obtained by modifying the above structure of FIG. 12. In the present embodiment, the first processor 9 is used to generate an audio signal, though the second processor 10 was used to generate the audio signal in FIG. 12.

Thus, compared with the structure of the above third embodiment shown in FIG. 5, the present embodiment has the effect of reducing the load on the processor 9, since the audio signal processing circuit 5 performs a digital filtering operation.

THIRTEENTH EMBODIMENT

FIG. 15 shows a thirteenth embodiment, which was obtained by partly modifying the structure of FIG. 12. That is, though the second processor 10 was used to generate an audio signal and the audio signal processing circuit 5 was used to perform a digital filtering process with respect to the audio signal in the above structure of FIG. 12, a third processor 17 for executing the filtering program and generating the audio signal is separately provided and the second processor 10 is used to set the control command 3 to the third processor 17, according to the present embodiment.

Thus, in addition to the same effect as obtained in the third embodiment shown in FIG. 5, the present embodiment has the effect of reducing the load on the first processor and on the second processor 10, since the third processor 17 executes the filtering program. Moreover, since the second processor 10 for executing the window system controls the display unit 2 and the third processor 17 for supplying the audio signal, the present embodiment also has the effect of easily achieving the synchronization of the window on the screen of the display unit 2 with the corresponding audio from the audio output circuit 6.

FOURTEENTH EMBODIMENT

Figure 16:
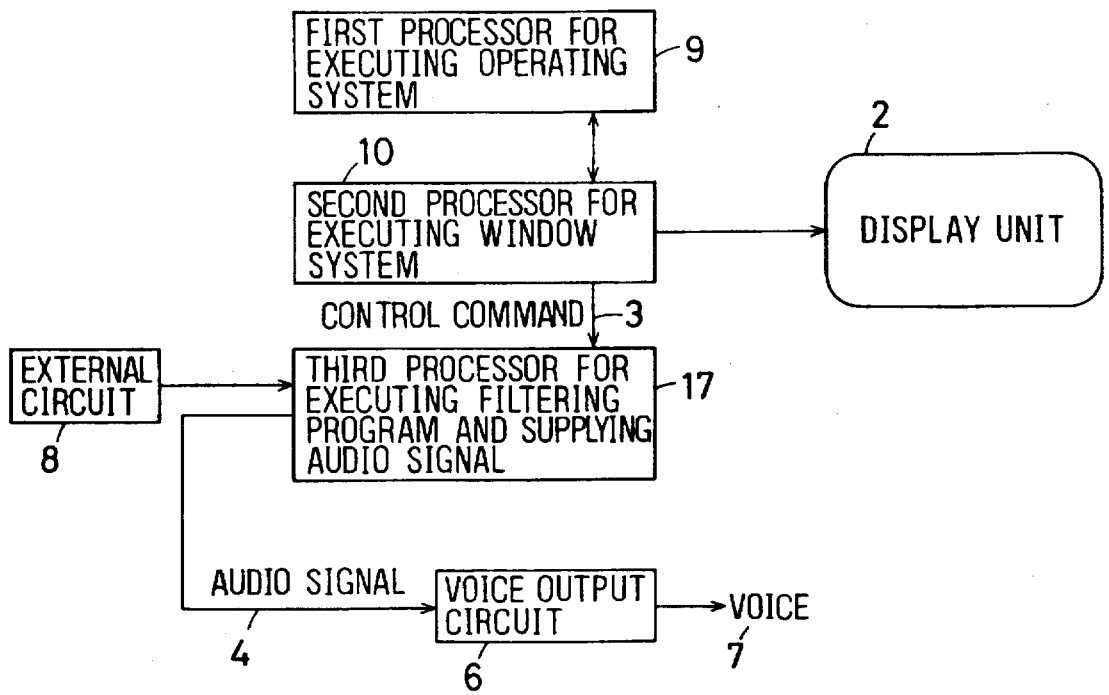
FIG. 16 is a block diagram showing the structure of a fourteenth embodiment.

FIG. 16 shows a fourteenth embodiment, which was obtained by partly modifying the structure of FIG. 15. In the present embodiment, the third processor 17 does not generate an audio signal. Instead, an external circuit 8 having the same structure as that of the above external circuit 8 of FIG. 2 is provided so that the external circuit 8 converts an analog signal outputted from, e.g., an amplifier or the like to the digital audio waveform, which is to be supplied to the third processor 17.

Thus, in addition to the same effect as obtained in the above thirteenth embodiment, the present embodiment has the effect that an analog signal from a microphone or the like can be used together with the window, since an audio can be produced from the audio output circuit 6 by converting an analog signal from, e.g., an external microphone or amplifier to the digital signal by means of the external circuit 8.

FIFTEENTH EMBODIMENT

Figure 17:
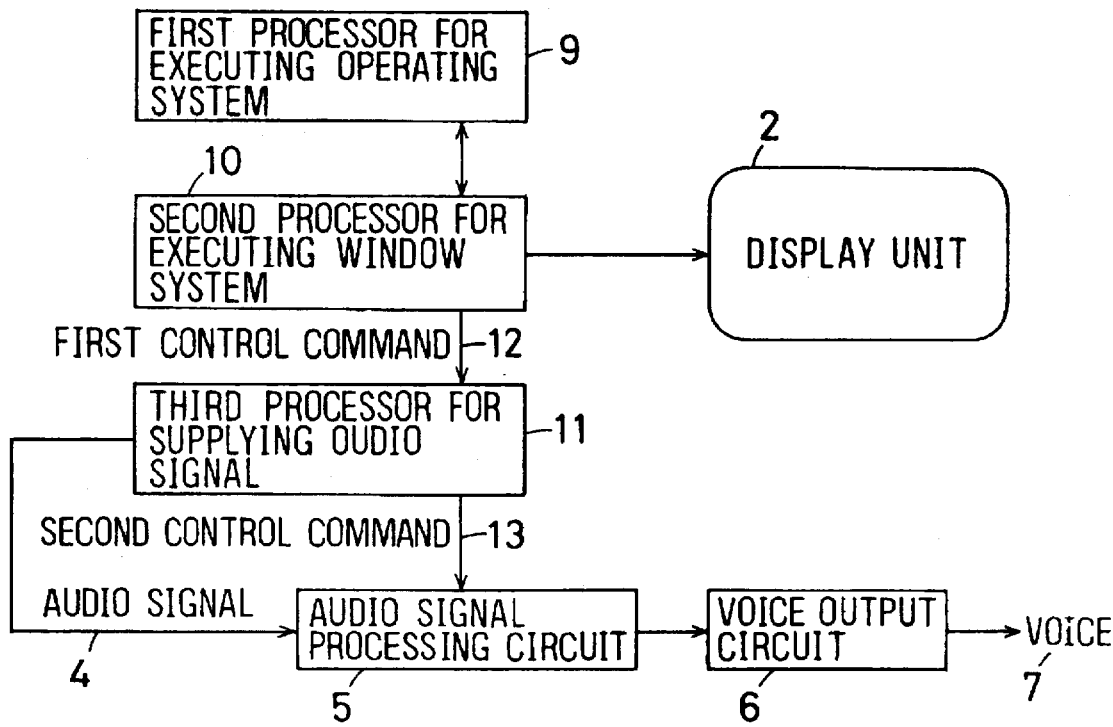
FIG. 17 is a block diagram showing the structure of a fifteenth embodiment.

FIG. 17 shows a fifteenth embodiment, which was obtained by partly modifying the structure shown in FIG. 15. According to the present embodiment, the third processor 11 is intended to generate, based on the results of internal calculations, a digital audio waveform serving as an audio signal and a second control command 13, which corresponds to the first control command, is set simultaneously with the setting of the first control command by the second processor 10. In addition, the audio signal processing circuit 5 is separately provided so that the audio signal 4 generated from the above third processor 11 is supplied thereto. The audio signal processing circuit 5 is intended to perform, with respect to the supplied audio signal 4, a digital filtering process in accordance with the second control command 13.

Thus, according to the present embodiment, if a window in the forefront of the screen of the display unit 2 is hidden by another window, the third processor 11 sets the second control command 13 to the audio signal processing circuit 5 so that the above third processor 11 performs a digital filtering process with respect to the audio signal 4. Therefore, compared with the above fourteenth embodiment, the present embodiment has the effect of reducing the load on the third processor 13, since the audio signal processing circuit 5 performs a digital filtering process.

SIXTEENTH EMBODIMENT

Figure 18:
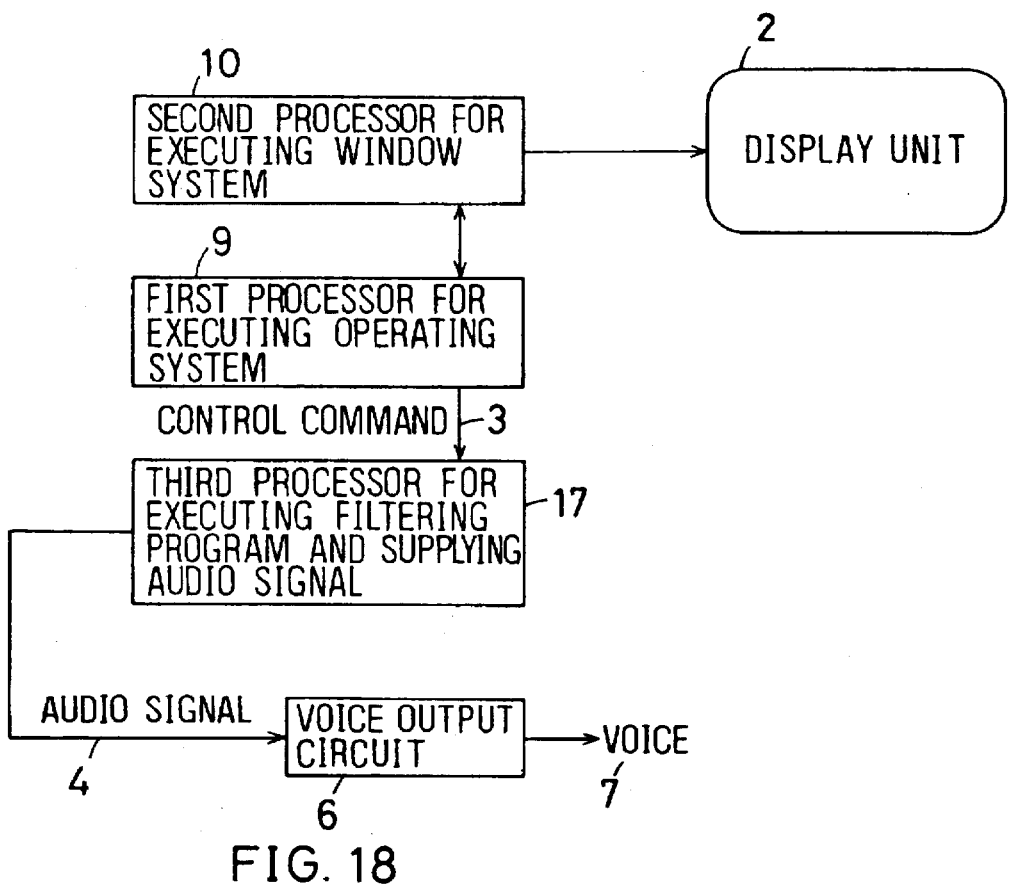
FIG. 18 is a block diagram showing the structure of a sixteenth embodiment.

FIG. 18 shows a sixteenth embodiment, which was obtained by partly modifying the structure of the third embodiment shown in FIG. 5. Although the first processor 15 executes the operating system and filtering program and generates the audio signal 4 in FIG. 5, as described above, the first processor 9 executes only the operating system and the control command 3 corresponding to the current state of the formerly forefront window being hidden by another window is set in the present embodiment. In addition, the third processor 17 is separately provided so as to generate the audio signal 4 and to execute the filtering program. In accordance with the control command 3 set by the first processor 9, the third processor 17 is intended to perform a digital filtering process with respect to the audio signal 4.

Thus, in addition to same effect as obtained in the third embodiment, the present embodiment has the effect of reducing the load on the first and second processors 9 and 10, since the third processor 17 executes the filtering program and supplies an audio signal. Moreover, since the first processor 9 for executing the operating system controls the second processor 10 and the third processor 17, the present embodiment also has the effect of synchronizing a change in the window on the screen of the display unit 2 with a change in the audio from the audio signal output circuit 8.

SEVENTEENTH EMBODIMENT

Figure 19:
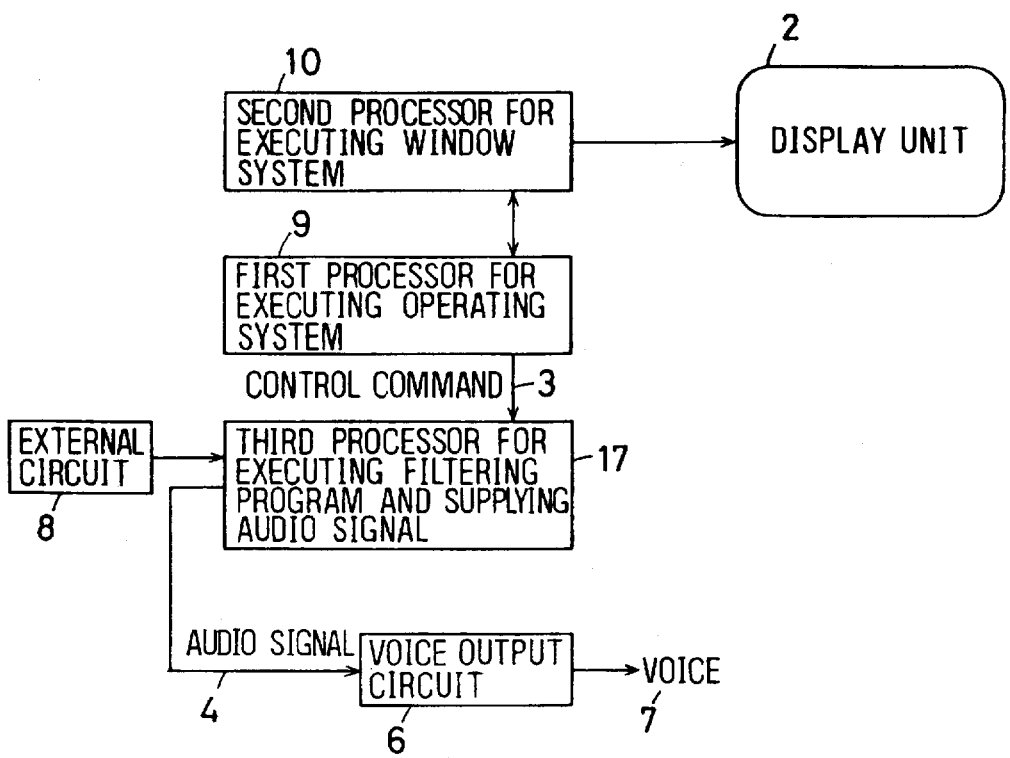
FIG. 19 is a block diagram showing the structure of a seventeenth embodiment.

FIG. 19 shows a seventeenth embodiment, which is obtained by partly modifying the above structure of FIG. 18, adding an external circuit 18 having the same structure as that of the above external circuit 8 of FIG. 2, and deleting the function of generating an audio signal from the third processor.

Thus, in addition to the same effect as obtained in the above sixteenth embodiment, the present embodiment has the effect that an analog signal from a microphone or the like can be used together with the window, since an audio can be produced from the audio output circuit 6 by converting an analog signal from, e.g., an external microphone or amplifier to the digital signal by means of the external circuit 8.

EIGHTEENTH EMBODIMENT

Figure 20:
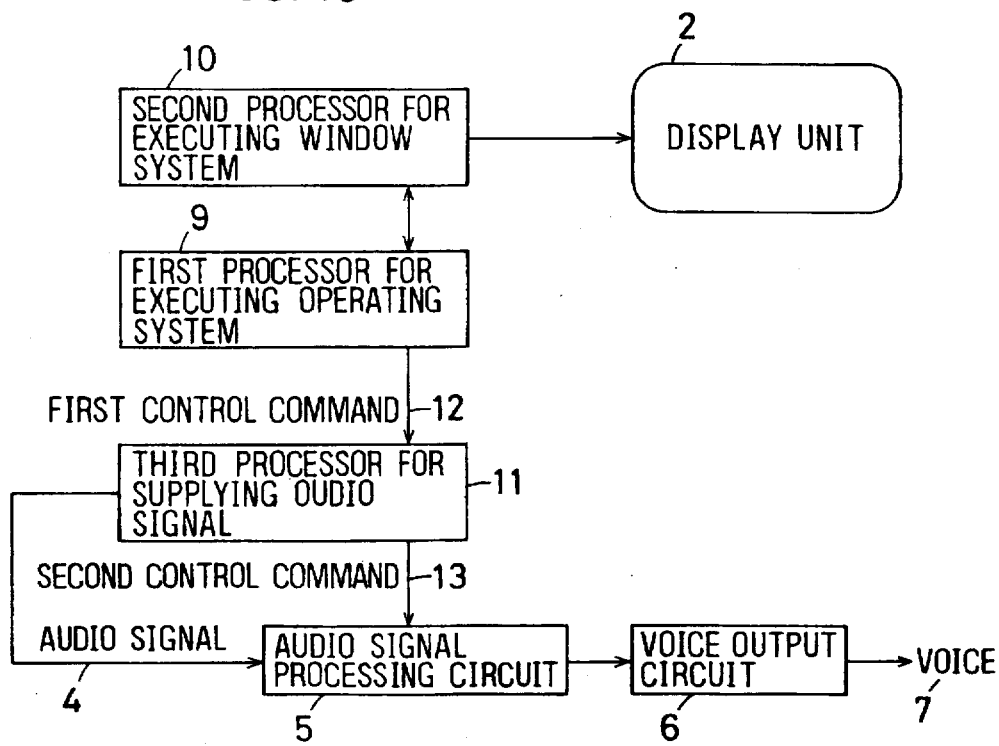
FIG. 20 is a block diagram showing the structure of an eighteenth embodiment.

FIG. 20 shows an eighteenth embodiment, which was obtained by partly modifying the structure of the above sixteenth embodiment shown in FIG. 18. That is, though the third processor 17 had the functions of executing the filtering program and generating an audio signal in FIG. 18, the third processor 17 is used to generate the audio signal 4 and to set the corresponding second control command when the window is hidden. In addition, the audio signal processing circuit 5 having the same structure as that of the above audio signal processing circuit 5 of FIG. 3 is separately provided so as to perform, with respect to the audio signal 4, a digital filtering process in accordance with the above second control command 13.

Thus, in addition to the same effect as obtained in the above sixteenth embodiment, the present embodiment has the effect of reducing the load on the third processor 11, since the audio signal processing circuit 5 performs a digital filtering process.

I claim:

1. A multi-window apparatus with audio output function comprising:

an audio signal generating means for generating an audio signal;

a control means for executing an operating system, a window system, and a filtering process and accepting the audio signal outputted from said audio signal generating means;

a display unit for displaying a window which was generated through the execution of the window system by said control means; and an audio output circuit for accepting the audio signal supplied from said control means and producing an audio, said multi-window apparatus with audio output function displaying the window on the screen of said display unit, while enabling said audio output circuit to produce the audio corresponding to said window constantly or if required, wherein said control means further includes a window change detecting means for detecting a size change of the window or a position change of the window to a background or a foreground of another window, which occurs in the window displayed on the screen of said display unit, while the audio corresponding to the displayed window is being produced from said audio output circuit, and an audio signal filtering means responsive to said window change detecting means so as to perform, when said window change detecting means detects said size change of the window or said position change of the window to the background or the foreground of another window regardless of a location change of a cursor or a pointer, a specific filtering process corresponding to the size or position change of the window with respect to the audio signal corresponding to the window that is changed in size or position to be supplied to said audio output circuit.

2. A multi-window apparatus with audio output function according to claim 1, wherein said control means is composed of a single processor.

3. A multi-window apparatus with audio output function according to claim 1, wherein said control means is composed of:

a processor for executing the operating system and window system and setting a control command in the case of the window change; and an audio signal processing circuit for performing, in accordance with the control command set by said processor, a specific filtering process corresponding to the window change with respect to the audio signal to be supplied to the audio output circuit.

4. A multi-window apparatus with audio output function according to claim 1, wherein said control means is composed of:

a first processor for executing the operating system and filtering process, accepting the audio signal outputted from the audio signal generating means, and performing, in the case of the window change, a specific filtering process corresponding to the window change with respect to the audio signal to be supplied to the audio output circuit; and a second processor for executing the window system.

5. A multi-window apparatus with audio output function according to claim 1, wherein said control means is composed of:

a third processor for executing the operating system; and a fourth processor for executing a window system and a filtering process and for accepting the audio signal outputted from the audio signal generating means and performing, in the case of the window change, a specific filtering process corresponding to the window change with respect to the audio signal to be supplied to the audio output circuit.

6. A multi-window apparatus with audio output function according to claim 1, wherein said control means is composed of:

a fifth processor for executing the operating system and setting a control command in the case of the window change;

a sixth processor for executing the window system; and an audio signal processing circuit for performing, in accordance with the control command, a specific filtering process corresponding to the window change with respect to the audio signal to be supplied to the audio output circuit.

7. A multi-window apparatus with audio output function according to claim 1, wherein said control means is composed of:

a seventh processor for executing the operating system;

an eighth processor for setting a control command in the case of the window change; and an audio signal processing circuit for performing, in accordance with the control command, a specific filtering process corresponding to the window change with respect to the audio signal to be supplied to the audio output circuit.

8. A multi-window apparatus with audio output function according to claim 6 or 7, wherein said audio signal processing circuit is composed of another processor.

9. A multi-window apparatus with audio output function as in one of claims 1–7, wherein said audio signal generating means is an external circuit connected to the control means.

10. A multi-window apparatus with audio output function according to claim 6, wherein said audio signal generating means is composed of the fifth processor.

11. A multi-window apparatus with audio output function according to claim 7, wherein said audio signal generating means is composed of the eighth processor.

12. A multi-window apparatus with audio output function as in one of claims 1–7, wherein said control means performs, if the window is hidden behind another window, a band-pass filtering process with respect to the audio signal corresponding to the hidden window.

13. A multi-window apparatus with audio output function as in one of claims 1–7, wherein said control means performs, if the window is reduced in area, a low-pass filtering process with respect to the audio signal corresponding to the reduced window.

14. A multi-window apparatus with audio output function as in one of claims 1–7, wherein said control means performs, if the window is iconized, a high-pass filtering process with respect to the audio signal corresponding to the iconized window.

* * * * *

UNITED STATES PATENT AND TRADEMARK OFFICE
CERTIFICATE OF CORRECTION

PATENT NO. : 5,682,166
DATED : October 28, 1997
INVENTOR(S) : Satoshi TAKAHASHI

It is certified that error appears in the above-indentified patent and that said Letters Patent is hereby corrected as shown below:

In the Title [54], and col. 1    after "FUNCTION" insert --CORRESPONDING TO RELATIVE POSITION AND SIZE OF EACH DISPLAYED WINDOW--.

Signed and Sealed this

Tenth Day of March, 1998

*Attest:*

BRUCE LEHMAN

*Attesting Officer*      *Commissioner of Patents and Trademarks*